(12) United States Patent
Jacobsson et al.

(10) Patent No.: US 10,284,252 B2
(45) Date of Patent: May 7, 2019

(54) TRANSCEIVER WITH ALTERNATING MODE OF OPERATION

(71) Applicant: Telefonaktiebolaget LM Ericsson (publ), Stockholm (SE)

(72) Inventors: Harald Jacobsson, Göteborg (SE); Mats Rydström, Billdal (SE); Per-Arne Thorsén, Öjersjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 16 days.

(21) Appl. No.: 15/576,392

(22) PCT Filed: May 28, 2015

(86) PCT No.: PCT/EP2015/061795
§ 371 (c)(1),
(2) Date: Nov. 22, 2017

(87) PCT Pub. No.: WO2016/188575
PCT Pub. Date: Dec. 1, 2016

(65) Prior Publication Data
US 2018/0159586 A1 Jun. 7, 2018

(51) Int. Cl.
*H04B 1/38* (2015.01)
*H04B 1/56* (2006.01)
(Continued)

(52) U.S. Cl.
CPC .............. *H04B 1/56* (2013.01); *H04B 1/401* (2013.01); *H04B 7/0689* (2013.01);
(Continued)

(58) Field of Classification Search
CPC ........ H04B 1/56; H04B 1/401; H04L 25/0202
(Continued)

(56) References Cited

U.S. PATENT DOCUMENTS 6,512,480 B1 1/2003 Reudink
7,003,058 B2 2/2006 Bach et al.
(Continued)

FOREIGN PATENT DOCUMENTS

WO 2006071153 A1 7/2006
WO 2014202156 A1 12/2014

OTHER PUBLICATIONS

Bharadia, Dinesh et al., "Full Duplex Radios", Proceedings of the ACM SIGCOMM 2013 conference on SIGCOMM, 2013, 1-12.
(Continued)

*Primary Examiner* — Helene E Tayong
(74) *Attorney, Agent, or Firm* — Murphy, Bilak & Homiller, PLLC

(57) ABSTRACT

A transceiver (100) is disclosed for a communication node adapted to transmit a first signal to an other communication node and to receive a second signal from the other communication node. The transceiver comprises at least one antenna (110), at least one transmitter module (120), at least one receiver module (130), and a mode alternator (160). The at least one antenna is adapted to simultaneously transmit the first signal and receive the second signal, wherein the first and second signals have equal carrier frequencies and different polarizations. The second signal is for determining a channel characterization of a communication channel over which the second signal is received, and the channel characterization is for determination of one or more transmission parameters for the first signal. The mode alternator is adapted to alternate a mode of operation of the transceiver between at least a first and a second mode of operation. The first mode of operation comprises the transceiver transmitting the first signal using a first polarization and receiving the second signal using a second polarization, and the second mode of operation comprises the transceiver transmitting the first signal using a third polarization and receiv-
(Continued)

ing the second signal using a fourth polarization. Corresponding communication node, communication system, method and computer program product are also disclosed.

18 Claims, 4 Drawing Sheets

(51) Int. Cl.
    *H04B 1/401*     (2015.01)
    *H04B 7/06*     (2006.01)
    *H04B 7/08*     (2006.01)
    *H04B 7/10*     (2017.01)
    *H04L 25/02*     (2006.01)

(52) U.S. Cl.
    CPC ............. *H04B 7/0871* (2013.01); *H04B 7/10* (2013.01); *H04B 7/0626* (2013.01); *H04L 25/0202* (2013.01)

(58) Field of Classification Search
    USPC ........................................................ 375/219
    See application file for complete search history.

(56) References Cited

U.S. PATENT DOCUMENTS

| | | |
|---|---|---|
| 8,948,235 B2 | 2/2015 | Negus et al. |
| 9,059,767 B2* | 6/2015 | Zhang ..................... H04B 7/10 |
| 2006/0087385 A1 | 4/2006 | Fitzpatrick et al. |
| 2009/0087194 A1* | 4/2009 | Nakashima ........ H04B 10/2572 |
| | | 398/158 |
| 2013/0343235 A1 | 12/2013 | Khan |
| 2016/0183100 A1* | 6/2016 | Xue ..................... H04W 24/02 |
| | | 370/252 |

OTHER PUBLICATIONS

Hua, Yingbo et al., "A Method for Broadband Full-Duplex MIMO Radio", IEEE Signal Processing Letters, vol. 19, No. 12, Dec. 2012, 793-796.

Sun, Shu et al., "MIMO for Millimeter-Wave Wireless Communications: Beamforming, Spatial Multiplexing, or Both?", IEEE Communications Magazine, vol. 52, Issue 12, Dec. 11, 2014, pp. 110-121.

* cited by examiner

TRANSCEIVER WITH ALTERNATING
MODE OF OPERATION

TECHNICAL FIELD

The present invention relates to the field of transceivers for wireless communication.

BACKGROUND

In many typical communication systems, a characterization of the communication channel may be determined (e.g. estimated) and used to improve performance (e.g. capacity, throughput, error rate, etc.) of future communication (transmission and/or reception). Well known examples of such channel characterization include channel state information (CSI), channel quality indication (CQI), and channel impulse response estimates in general. Well known ways to apply the channel characterization include pre-coding (e.g. beam forming for multi-antenna systems such as multiple input multiple output (MIMO) systems, phase array systems, and massive MIMO systems).

In some applications, a first device transmitting to a second device over a communication channel uses a channel characterization produced by the second device to improve performance related to its transmission. The channel characterization may typically be conveyed from the second device to the first device through some kind of feed-back mechanism.

Example drawbacks of such an approach include increased signaling overhead, limited channel characterization accuracy (due to quantization of the information to be fed back), and delayed update of the applied channel characterization by the first device.

In some applications, if time division duplex (TDD) is used with transmission and reception at the same frequency, reciprocity may be assumed and a channel characterization produced by the first device may be used by the first device to improve performance related to its transmission, instead of a channel characterization produced by the second device. It is often assumed that TDD must be used for some systems to work efficiently. One example is fifth generation communication systems applying massive MIMO, where a TDD mode of operation is often selected at least partly due to the above mentioned feedback issues.

Example drawbacks of such an approach include increased buffering needs at the transmitter (due to the transmission interruptions inherent in TDD) and increased latency (also due to the transmission interruptions inherent in TDD). Other drawbacks of TDD include reduced throughput, slow update of the applied channel characterization, and inferior synchronization.

WO 2014/202156 A1 discloses a transceiver arrangement for a fixed point-to-point radio link. The transceiver arrangement comprising a transceiver connected to a first antenna and to a second antenna. The transceiver being arranged to transmit a first transmit signal via the first antenna in a first frequency band, the transceiver also being arranged to receive a first receive signal via the first antenna in a second frequency band, the transceiver further being arranged to transmit a second transmit signal via the second antenna in the second frequency band, the transceiver also being arranged to receive a second receive signal via the second antenna in the first frequency band.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

The inventors have realized that signals can advantageously be transmitted between nodes by using different polarization in different directions, and alternating the polarization over time.

According to a first aspect this is achieved by a transceiver for a communication node adapted to transmit a first signal to an other communication node and to receive a second signal from the other communication node.

The transceiver comprises at least one antenna, at least one transmitter module, at least one receiver module, and a mode alternator.

The at least one antenna is adapted to simultaneously transmit the first signal and receive the second signal. The first and second signals have equal carrier frequencies and different polarizations. The second signal is for deteilnining a channel characterization of a communication channel over which the second signal is received, and the channel characterization is for determination of one or more transmission parameters for the first signal.

The at least one transmitter module is adapted to process the first signal before transmission by the at least one antenna and the at least one receiver module is adapted to process the second signal after reception by the at least one antenna.

The mode alternator is adapted to alternate a mode of operation of the transceiver between at least a first and a second mode of operation. The first mode of operation comprises the transceiver transmitting the first signal using a first polarization and receiving the second signal using a second polarization. The second mode of operation comprises the transceiver transmitting the first signal using a third polarization and receiving the second signal using a fourth polarization.

The alternation between different modes of operation may typically be synchronized between transmission and reception parts of the transceiver. In some embodiments, a guard interval may be applied to accommodate the alternation.

The communication node may be a network node (such as, for example, a base station, a NodeB, an eNodeB, etc.).

The at least one antenna may, for example, be an antenna system, an antenna array, an antenna matrix, or similar.

Processing by the transmitter and receiver modules may comprise any suitable processing (such as, for example, amplification, gain control, filtering, adaptive filtering, analog-to-digital conversion, digital-to-analog conversion, etc.).

The channel characterization may, for example, comprise a channel estimate or a channel quality metric. Examples of channel characterizations include channel state information (CSI) and channel quality indication (CQI). The channel characterization may, for example, be determined by using any suitable method, for example, a least mean square (LMS) approach or a minimum mean square error (MMSE) approach.

The different polarizations of the first and second signals are typically orthogonal (e.g. 90 degrees relative to each other). However, leakage between polarizations may occur in some embodiments. Hence, one or more of the first and second signals may comprise (minor) components of the other signal.

In some embodiments, the first polarization is different from the third polarization and the second polarization is different from the fourth polarization.

In some embodiments, the third polarization equals the second polarization and the fourth polarization may equal the first polarization. Such embodiments may, for example, be embodiments with only two modes of operation.

In some embodiments, there may be more than two modes of operation. Generally, the mode alternator may be adapted to sequentially apply any suitable pairs of orthogonal polarization for transmission and reception, respectively. For example, the mode alternator may use the following collections of polarization pairs: [0, π/2], [k, π/2+k], [2k, π/2+2k], . . . , [−k, π/2−k], where π/2k is an integer. In a typical example, k=π/2.

In some embodiments, the one or more transmission parameters may comprise pre-coding coefficients and the transceiver may further comprise a channel estimator adapted to provide the channel characterization based on the processed second signal and a pre-coder adapted to apply the pre-coding coefficients to the first signal before processing by the at least one transmitter module.

Pre-coding coefficients may, for example, be used for beam-forming in MIMO systems.

In some embodiments, the one or more transmission parameters may comprise modulation and coding schemes (MCS).

In some embodiments where the third polarization is equal to the second polarization and the fourth polarization is equal to the first polarization, the at least one transmitter module may comprise first and second transmitter modules adapted to process the first signal according to the first and second polarization, respectively, and the at least one receiver module may comprise first and receiver modules adapted to process the second signal according to the first and second polarization, respectively.

In such embodiments, the mode alternator may comprise a signal distribution network adapted to:
  during a first duration of time, apply the first mode of operation by operatively connecting the at least one antenna to the first transmitter module and to the second receiver module, and by causing determination of the channel characterization based on an output of the second receiver module, and
  during a second duration of time, apply the second mode of operation by operatively connecting the at least one antenna to the second transmitter module and to the first receiver module, and by causing application of one or more transmission parameters to the first signal wherein the one or more transmission parameters are determined based on the channel characterization determined during the first duration of time.

For example, determination of the channel characterization based on an output of the second receiver module may be caused by operatively connecting a channel estimator to the second receiver module during the first duration of time.

The mode alternator may, in these embodiments, be adapted to connect the at least one antenna to the first and second transmitter modules and to the first and second receiver modules via a polarization duplexer (e.g. an orthomode, transducer (OMT), a polarization duplexer).

In some embodiments where the third polarization is equal to the second polarization and the fourth polarization is equal to the first polarization, the at least one antenna may comprise a first antenna system adapted to transmit and receive signals according to the first polarization and a second antenna system adapted to transmit and receive signals according to the second polarization.

In such embodiments, the mode alternator may comprise a signal distribution network adapted to:
  during a first duration of time, apply the first mode of operation by operatively connecting the first antenna system to the at least one transmitter module and operatively connecting the second antenna system to the at least one receiver module, and by causing determination of the channel characterization based on an output of the at least one receiver module, and
  during a second duration of time, apply the second mode of operation by operatively connecting the first antenna system to the at least one receiver module and operatively connecting the second antenna system to the at least one transmitter module, and by causing application of one or more transmission parameters to the first signal wherein the one or more transmission parameters are determined based on the channel characterization determined during the first duration of time.

The signal distribution networks may, for example, comprise any or more of connectors, switches, and signal routing means, as suitable. In some embodiments, the signal distribution network may operatively connect all applicable components (antenna(s), transmitter/receiver module(s), channel estimator, pre-coder, etc.) as suitable at all times, and each of the respective components may have a selector for selecting which connections (e.g. ports) to use during a particular duration of time.

According to some embodiments, the mode alternator may be adapted to alternate the mode of operation periodically. The period of the periodical alternation may be static or dynamic. For example, the period may be based on how often a deterioration of a performance metric is detected or on a worst case interval for updating the transmission parameters.

In some embodiments, the mode alternator may be adapted to alternate the mode of operation based on a (possibly estimated) coherence time of the communication channel.

According to some embodiments, the mode alternator may be adapted to alternate the mode of operation when a deterioration of a performance metric is detected. In some embodiments, this approach may be combined with the mode alternator being further adapted to alternate the mode of operation when a maximum time interval has elapsed since a previous alternation.

The deterioration may be manifested as an increase or a decrease of the performance metric depending on which metric is used. Examples of performance metrics include channel estimation value, bit error rate (BER), signal-to-noise ratio (SNR), signal-to-interference ratio (SIR), signal-to-noise-and-interference ratio (SNIR), received signal strength indicator (RSSI), etc.

In some types of embodiments, the at least one transmitter module may be adapted to stop the transmission of the first signal to initiate alternation of the mode of operation. The at least one receiver module may be adapted to detect interruption in the received second signal after the transmission of the first signal has been stopped and the mode alternator may be adapted to alternate the mode of operation responsive to detection of the interruption. The at least one transmitter module may be adapted to resume the transmission of the first signal after the mode of operation has been alternated. In some embodiments, the transceiver may (as an alternative to detecting interruption in the received second signal and alternating the mode of operation responsive to detection of the interruption) be adapted to alternate the mode of operation when twice a transfer time between the communication node and the other communication node has elapsed. The transfer time may be known beforehand by the transceiver or the transceiver may be further adapted to estimate the transfer time.

In some types of embodiments, the at least one receiver module may be adapted to detect interruption in the received second signal and interpret the interruption as initiation of alternation of the mode of operation and the mode alternator may be adapted to alternate the mode of operation responsive to detection of the interruption.

The latter two types of embodiments are combinable. For each specific mode alternation, the network node comprising the transceiver typically exercises the abilities enabled by the first type of embodiments and the other network node exercises the abilities enabled by the second type of embodiments, or vice versa.

These types of embodiments may be particularly beneficial when there is no precision time synchronization between the network node comprising the transceiver and the other network node (typically, both network nodes have respective time keeping units (e.g. clocks) with no or reasonably low time drift there between). The mechanism of initiating the alternation of the mode of operation by stopping transmission provides for inherent synchronization of the switch between polarizations.

In some types of embodiments, the communication node and the other communication node are synchronized in time. For such embodiments, a mode alternation notification communicated between the communication node and the other communication node may be adapted to initiate alteration of the mode of operation and may indicate a mode alternation initiation condition.

The mode alternation initiation condition may, for example, comprise a (absolutely or relatively) specified point in time. The point in time may be defined using any suitable time metric (e.g. seconds, packets, frames, segments, etc.).

In such types of embodiments, the at least one receiver module may be adapted to receive the mode alternation notification from the other node and the at least one transmitter module may be adapted to stop the transmission of the first signal when the mode alternation initiation condition is fulfilled. The at least one receiver module may be adapted to detect interruption in the received second signal after the mode alternation initiation condition is fulfilled, the mode alternator may be adapted to alternate the mode of operation responsive to detection of the interruption, and the at least one transmitter module may be adapted to resume the transmission of the first signal after the mode of operation has been alternated. In some embodiments, the transceiver may (as an alternative to detecting interruption in the received second signal and alternating the mode of operation responsive to detection of the interruption) be adapted to alternate the mode of operation when the mode alternation initiation condition is fulfilled.

Alternatively or additionally in such types of embodiments, the at least one transmitter module may be adapted to transmit the mode alternation notification to the other node, and the at least one transmitter module may be adapted to stop the transmission of the first signal when the mode alternation initiation condition is fulfilled. The at least one receiver module may be adapted to detect interruption in the received second signal after the mode alternation initiation condition is fulfilled, the mode alternator may be adapted to alternate the mode of operation responsive to detection of the interruption, and the at least one transmitter module may be adapted to resume the transmission of the first signal after the mode of operation has been alternated. In some embodiments, the transceiver may (as an alternative to detecting interruption in the received second signal and alternating the mode of operation responsive to detection of the interruption) be adapted to alternate the mode of operation when the mode alternation initiation condition is fulfilled.

The teachings of the latter two paragraphs are combinable. For each specific mode alternation, the network node comprising the transceiver typically exercises the abilities enabled by the first of these paragraphs and the other network node exercises the abilities enabled by the second of these paragraphs, or vice versa.

According to some embodiments, the at least one transmitter module may be adapted to interrupt the transmission of the first signal during a guard interval in association with the mode alternator alternating the mode of operation.

The guard interval may be any suitable time window that allows for accommodating actions to be carried out for implementing the mode alternation (e.g. changing position of switches).

The guard interval may be defined as a time between stopping transmission and resuming transmission.

A second aspect is a communication node comprising the transceiver of the first aspect.

A third aspect is a communication system comprising two transceivers according to the first aspect. Typically, such a system comprises two network nodes according to the second aspect (i.e. each network node comprising a transceiver according to the first aspect).

A fourth aspect is a communication system comprising first and second transceivers, each comprising at least one antenna, at least one transmitter module, at least one receiver module, and a mode alternator.

The first transceiver is adapted to transmit a first signal to the second transceiver and to receive a second signal from the second transceiver. The second transceiver is adapted to transmit the second signal to the first transceiver and to receive the first signal from the first transceiver. The first and second signals have equal carrier frequencies and different polarizations.

The at least one antenna of the first transceiver is adapted to simultaneously transmit the first signal and receive the second signal. The at least one antenna of the second transceiver is adapted to simultaneously transmit the second signal and receive the first signal.

For each of the transceivers, the respective received signal is for determining a channel characterization of a communication channel over which the received signal is received, and the channel characterization is for determination of one or more transmission parameters for the respective transmitted signal.

For each of the transceivers, the at least one transmitter module is adapted to process the respective transmitted signal before transmission by the at least one antenna and the at least one receiver module is adapted to process the respective received signal after reception by the at least one antenna.

For each of the transceivers, the mode alternator is adapted to alternate a mode of operation of the transceiver between at least a first and a second mode of operation. The first mode of operation comprises the transceiver transmitting the first signal using a first polarization and receiving the second signal using a second polarization. The second mode of operation comprises the transceiver transmitting the first signal using a third polarization and receiving the second signal using a fourth polarization.

The mode alternators are collectively adapted to, in relation to each particular mode alteration, switch to different modes of operation for the first and second transceivers.

The different polarizations of the first and second signals are typically orthogonal (e.g. 90 degrees relative to each other). However, leakage between polarizations may occur in some embodiments. Hence, one or more of the first and second signals may comprise (minor) components of the other signal.

In some embodiments, the first polarization is different from the third polarization and the second polarization is different from the fourth polarization.

In some embodiments, the third polarization equals the second polarization and the fourth polarization may equal the first polarization. Such embodiments may, for example, be embodiments with only two modes of operation.

In some embodiments, the fourth aspect may additionally have features identical with or corresponding to any of the various features as explained above for the first aspect.

A fifth aspect is a method of a transceiver for a communication node adapted to transmit a first signal to an other communication node and to receive a second signal from the other communication node.

The method comprises simultaneously transmitting the first signal and receiving the second signal via at least one antenna, wherein the first and second signals have equal carrier frequencies and different polarizations, wherein the second signal is for determining a channel characterization of a communication channel over which the second signal is received, and wherein the channel characterization is for determination of one or more transmission parameters for the first signal.

The method also comprises processing the first signal by at least one transmitter module before transmission by the at least one antenna and processing the second signal by at least one receiver module after reception by the at least one antenna.

The method further comprises alternating a mode of operation of the transceiver between at least a first and a second mode of operation. The first mode of operation comprises the transceiver transmitting the first signal using a first polarization and receiving the second signal using a second polarization, and the second mode of operation comprises the transceiver transmitting the first signal using a third polarization and receiving the second signal using a fourth polarization.

The different polarizations of the first and second signals are typically orthogonal (e.g. 90 degrees relative to each other). However, leakage between polarizations may occur in some embodiments. Hence, one or more of the first and second signals may comprise (minor) components of the other signal.

In some embodiments, the first polarization is different from the third polarization and the second polarization is different from the fourth polarization.

In some embodiments, the third polarization equals the second polarization and the fourth polarization may equal the first polarization. Such embodiments may, for example, be embodiments with only two modes of operation.

In some embodiments, the fifth aspect may additionally have features identical with or corresponding to any of the various features as explained above for the first aspect.

A sixth aspect is a computer program product comprising a computer readable medium, having thereon a computer program comprising program instructions. The computer program is loadable into a data-processing unit and adapted to cause execution of the method according to the fifth aspect when the computer program is run by the data-processing unit.

An advantage of some embodiments is that an accurate channel characterization may be achieved.

For example, unnecessary delays between estimation of the channel characterization and its application to the transmission parameters may be avoided. This is especially prominent compared to an approach with feedback of channel characterizations.

Furthermore, channel characterization may be conducted at both ends of a communication link (i.e. at the network node and at the other network node) at the same time. This is especially prominent compared to a traditional TDD approach.

Another advantage of some embodiments is that overhead signaling may be kept low. This is especially prominent compared to an approach with feedback of channel characterizations.

Another advantage of some embodiments is that transmission gaps are kept low (in terms of duration and/or number). Thus, almost continuous transmission may be achieved (at both network nodes). This may lower the requirements on transmission buffering and/or achieve a throughput evenly distributed in time. This is especially prominent compared to a traditional TDD approach.

Some embodiments may be particularly beneficial for large antenna configurations (e.g. multi-antenna and phased array systems, massive MIMO, etc.). Application of accurate transmission parameters (e.g. pre-coding coefficients) is typically critical in such systems. Furthermore, some embodiments may be particularly beneficial in line-of-sight (LOS) scenarios and/or scenarios with microwave frequencies, since orthogonally between polarizations and/or specific absolute polarization values are typically easier to achieve for such scenarios than for other scenarios.

A further advantage of some embodiments is that, if channel conditions are stable, unnecessary mode alternation may be avoided since traffic is flowing in both directions. This may lead to increased throughput (since guard intervals are avoided) and/or less overhead (since mode alternation notifications are avoided).

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where channel characterization (e.g. CSI) is achieved at both ends of a communication link in a full duplex (simultaneous transmission and reception) application, which uses the same frequency, but different and alternating polarizations, for transmission and reception.

Figure 1:
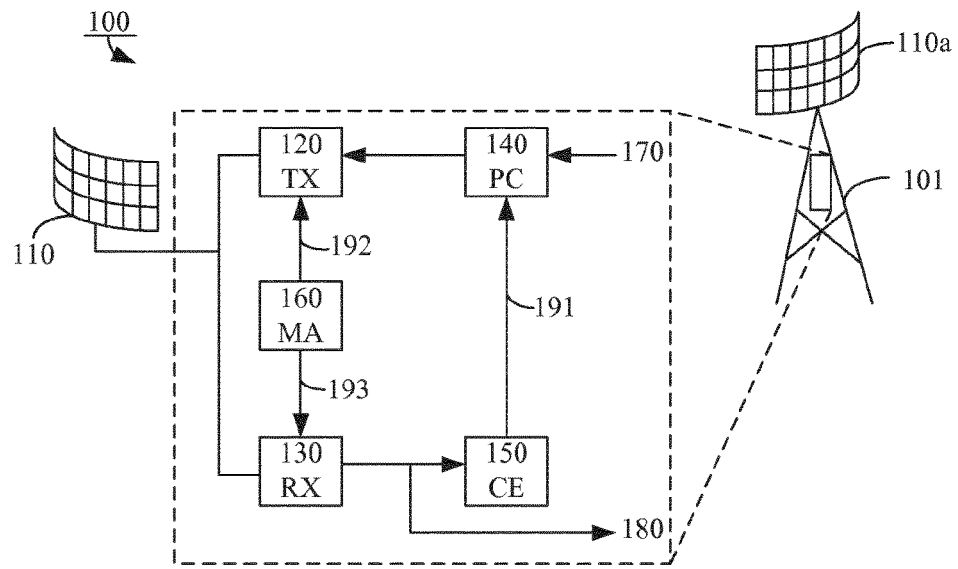
FIG. 1 is a block diagram illustrating an example transceiver according to some embodiments.
Figure 2:
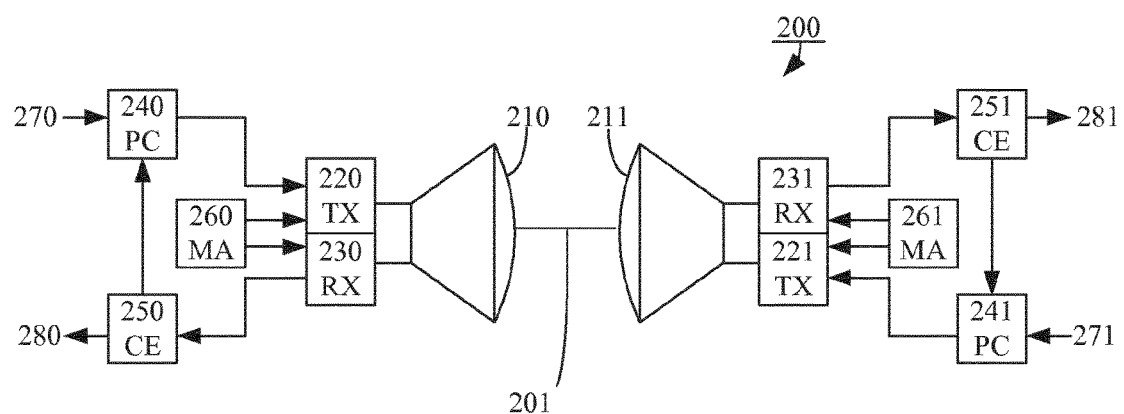
FIGS. 2-4 are block diagrams illustrating various example systems of two transceivers according to some embodiments.

FIGS. 1 and 2 illustrate, respectively, an example transceiver 100 and an example communication system 200 comprising two identical or similar transceivers. Typically, the example transceiver 100 is part of a network node 101.

The transceiver 100 is adapted to use a communication channel 201 to simultaneously transmit a first signal to an other transceiver and receive a second signal from the other transceiver, wherein the first and second signals have equal carrier frequencies and different polarizations. The first and second signals typically need to be isolated from each other, which may be achieved by any suitable approach (e.g. polarization duplexing, digital or analogue cancellation).

In a communication system, such as the example communication system 200, one transceiver receives the first signal and transmits the second signal when the other transceiver receives the second signal transmits the first signal, and vice versa. For simplicity of description, we will only describe transmission of the first signal and reception of the second signal although this is not intended to be limiting.

It is appreciated that, although embodiments are described herein where channel characterization is achieved at both ends of a communication link, there are potentially scenarios where channel characterization is only to be achieved at one end of the link. In such scenarios channel characterization is not necessarily performed at both ends of the communications link, but only at one end. A similar situation (i.e. where only one of the nodes performs a particular task) may also apply to other functions described herein.

The transceiver 100 comprises at least one antenna 110, 110a, 210, 211, at least one transmitter module (TX) 120, 220, 221, at least one receiver module (RX) 130, 230, 231, and a mode alternator (MA) 160, 260, 261. The at least one antenna will be referred to hereinafter as the antenna, even though it typically comprises a system of antennas (e.g. an antenna system, an antenna array, an antenna matrix, or similar).

The second signal is received by the antenna 110, 110a, 210, 211, processed (using any suitable approach) by at least one of the receiver modules 130, 230, 231, and output from the transceiver for further processing purposes 180, 280, 281. The second signal is also used to determine (using any suitable approach) a channel characterization of the communication channel 201 over which the second signal is received. The channel characterization may, for example, be determined by a channel estimator (CE) 150, 250, 251 of the transceiver as illustrated in FIGS. 1 and 2.

The channel characterization is used to determine one or more transmission parameters for the first signal. The first signal is input to the transceiver as illustrated by 170, 270, 271 and submitted to application of the transmission parameters before being processed (using any suitable approach) by at least one of the transmitter modules 120, 220, 221 and transmitted by the antenna 110, 110a, 210, 211. The transmission parameters may, for example, be pre-coding coefficients applied to the first signal by a pre-coder (PC) 140, 240, 241 of the transceiver as illustrated in FIGS. 1 and 2.

The channel estimator 150, 250, 251 may, for example, provide 191 either the channel characterization or the pre-coding coefficients to the pre-coder 140, 240, 241. Alternatively, the channel characterization is provided to a controller which determines the pre-coding coefficients and provides them to the pre-coder.

The transceiver 100 has at least two modes of operation, wherein the polarizations used for transmission and reception, respectively, are different for different modes of operation.

Hereinafter, we will describe the example case with two modes of operation and two (first and second) polarizations, wherein one (first) mode of operation comprises transmission using the first polarization and reception using the second polarization and the other (second) mode of operation comprises transmission using the second polarization and reception using the first polarization. However, it should be noted that other variations of the at least two modes of operation are possible. For example, there could be four (or more) modes of operation each using an orthogonal polarization pair for transmission and reception, respectively, as long as all polarizations that are used for transmission are also used for reception at some time, and vice versa.

It is appreciated that, due to physical effects, e.g., tolerance levels in production and errors in calibration, actual polarizations may differ slightly from intended polarizations. Thus, during operation, a first polarization used in transmission may differ slightly from the same first polarization used when receiving.

The mode alternator 160, 260, 261 is adapted to alternate the mode of operation of the transceiver. This may be achieved by control signals 192 and 293 to the transmitter module(s) and receiver module(s), respectively. A few examples of mode alternation implementations will be described in the following in connection to FIGS. 3 and 4.

The alternation between different modes of operation may typically be synchronized between transmission and reception parts of the transceiver. In some embodiments, a guard interval may be applied to accommodate the alternation. A few examples of guard interval implementations will be described in the following in connection to FIGS. 6 and 7.

There are numerous variations of when the mode of operation is to be alternated, a few of which will be given as example in the following. Various combinations of the examples may also be feasible. Thus, the mode may be alternated periodically or when a certain condition is fulfilled.

If altered periodically, the period may be static (fixed) or dynamic (variable). The period may, for example, be based on a coherence time (e.g. estimated, average, worst case, etc.) of the communication channel and/or on how often a deterioration of a performance metric of the transceiver is detected. If altered when a certain condition is fulfilled, the condition may be detection of a deterioration of a performance metric.

The deterioration may be manifested as an increase or a decrease of the performance metric depending on which metric is used. Examples of performance metrics include channel estimation value, bit error rate (BER), signal-to-noise ratio (SNR), signal-to-interference ratio (SIR), signal-to-noise-and-interference ratio (SNIR), received signal strength indicator (RSSI), etc. A detection of deterioration may, for example, comprise the performance metric falling on a particular side of a performance metric threshold.

Herein, when discussing performance of a transceiver, or of a communication system, it is implicitly referred to an achieved performance metric value. Relevant performance metrics for quantifying performance on a system level comprise throughput or data rate in terms of packets/sec or bits/sec, spectral efficiency of transmission in terms of bits/sec/Hz, and error rate performance such as bit or block error rates. These performance metrics are directly or indirectly influenced by performance metrics mentioned above, e.g., SNR.

In some embodiments, the mode may be altered when a certain condition is fulfilled or when a maximum time interval (e.g. a period of a periodical mode alternation scheme) has elapsed since a previous alternation, whichever occurs first.

Figure 3:
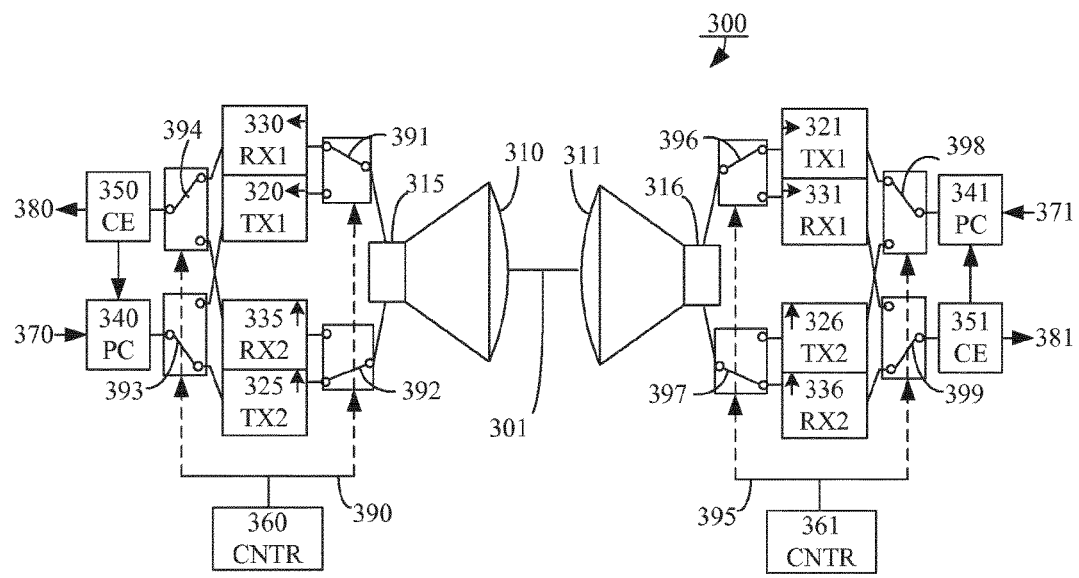
Figure 4:
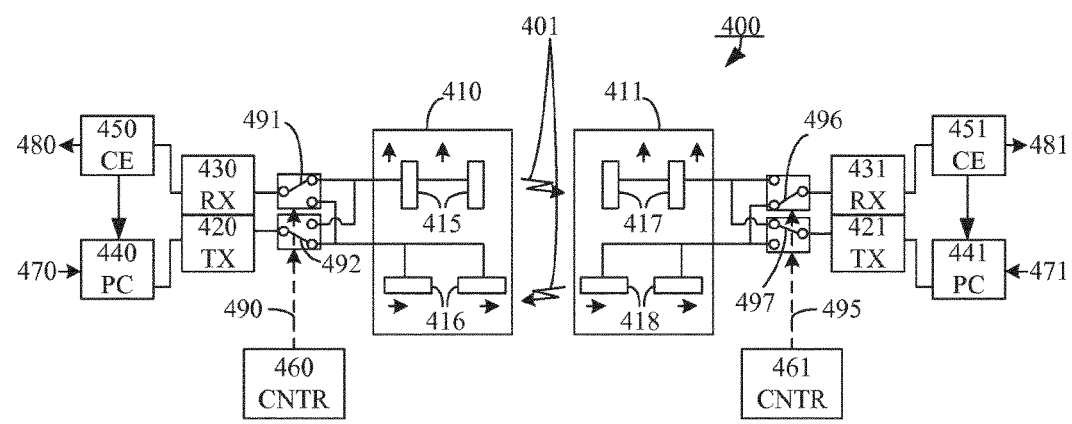

FIGS. 3 and 4 illustrate two different example implementations of the mode alternation function.

In FIG. 3, a system 300 is shown where the two polarizations are realized using first and second transmitter modules (TX1, TX2) 320, 321, 325, 326 for the first and second polarization (illustrated by horizontal and vertical arrows in FIG. 3), respectively, and first and receiver modules (RX1, RX2) 330, 331, 335, 336 for the first and second polarization, respectively.

The antenna 310, 311, the communication link 301, the channel estimator 350, 351, the pre-coder 340, 341, and the input/output of the transceiver 370, 371, 380, 381 are similar to the corresponding modules of FIGS. 1 and 2 and will not be described further here. The transmitter and receiver modules of different polarizations are separated by means of a polarization duplexer 315, 361 (e.g. an ortho-mode, transducer (OMT), a polarization duplexer, or similar).

In this example, the mode alternator comprises a signal distribution network. In FIG. 3, the signal distribution network is realized by switches 391, 392, 393, 394, 396, 397, 398, 399 controlled by a controller (CNTR) 360, 361 via control signals 390, 395.

During a first duration of time, one of the transceivers (the one to the left in FIG. 3) is in the first mode of operation and the other transceiver (the one to the right in FIG. 3) is in the second mode of operation. During a second duration of time, the mode of operation is alternated for both transceivers, and transmission parameters are applied which have been determined based on channel characterizations determined during the first duration of time, and so on during subsequent durations of time.

The first mode of operation is realized by setting the switches such that:
the antenna 310, 311 is operatively connected to the first transmitter module (TX1) 320, 321 via switch 391, 396,
the antenna 310, 311 is operatively connected to the second receiver module (RX2) 335, 336 via switch 392, 397,
the channel estimator (CE) 350, 351 is operatively connected to the second receiver module (RX2) 335, 336 via switch 394, 399, and
the pre-coder (PC) 340, 341 is operatively connected to the first transmitter module (TX1) 320, 321 via switch 393, 398.

The second mode of operation is realized by setting the switches such that:
the antenna 310, 311 is operatively connected to the second transmitter module (TX2) 325, 326 via switch 392, 397,
the antenna 310, 311 is operatively connected to the first receiver module (RX1) 330, 331 via switch 391, 396,
the channel estimator (CE) 350, 351 is operatively connected to the first receiver module (RX1) 330, 331 via switch 394, 399, and
the pre-coder (PC) 340, 341 is operatively connected to the second transmitter module (TX2) 325, 326 via switch 393, 398.

It is again appreciated that, due to physical effects, e.g., tolerance levels in production and errors in calibration, actual polarizations may differ slightly from intended polarizations internal to a transceiver and also between different transceivers. Thus, during operation, a first polarization used by a left-most transceiver during transmission may differ slightly from the same first polarization used by another, right-most transceiver when transmitting.

In FIG. 4, a system 400 is shown where the two polarizations are realized using (for each antenna 410, 420) first and second polarizers in the form of first and second antenna systems (e.g. realized by arrays of patch antennas) 415, 416 and 417, 418, respectively, for the first and second polarization (illustrated by horizontal and vertical arrows in FIG. 4). The transmitter and receiver modules of different polarizations are separated by means of the use of the different antenna systems.

The communication link 401, the channel estimator 450, 451, the pre-coder 440, 441, and the input/output of the transceiver 470, 471, 480, 481 are similar to the corresponding modules of FIGS. 1 and 2 and will not be described further here.

In this example, the mode alternator comprises a signal distribution network. In FIG. 4, the signal distribution network is realized by switches 491, 492, 496, 497 controlled by a controller (CNTR) 460, 461 via control signals 490, 495.

During a first duration of time, one of the transceivers (e.g. the one to the left in FIG. 4) is in the first mode of operation and the other transceiver (e.g. the one to the right in FIG. 4) is in the second mode of operation. During a second duration of time, the mode of operation is alternated for both transceivers, and transmission parameters are applied which have been determined based on channel characterizations detei mined during the first duration of time, and so on during subsequent durations of time.

The first mode of operation is realized by setting the switches such that:
the first antenna system 415, 417 is operatively connected to the transmitter module (TX) 420, 421 via switch 492, 497, and
the second antenna system 416, 418 is operatively connected to the receiver module (RX) 430, 431 via switch 491, 496.

The second mode of operation is realized by setting the switches such that:
the second antenna system 416, 418 is operatively connected to the transmitter module (TX) 420, 421 via switch 492, 497, and
the first antenna system 415, 417 is operatively connected to the receiver module (RX) 430, 431 via switch 491, 496.

A further example of how the mode alternator may be realized builds on the disclosure of WO 2006/071153 A1, where first and second antennas (or antenna systems) for first and second polarizations are both operatively connected to first and second polarization formers. The polarization formers of WO 2006/071153 A1 may be used in the context of this disclosure to construct the polarizations for reception and transmission, respectively, in the different modes of operation. Hence, the mode alternator comprises the polarization formers (and possibly a controller for setting parameters of the polarization formers) in this example, and no switches or connection selectors are needed. Another advantage with this approach is that the mode alternation may be performed very quickly since it, typically, only comprises digital baseband processing.

Figure 5:
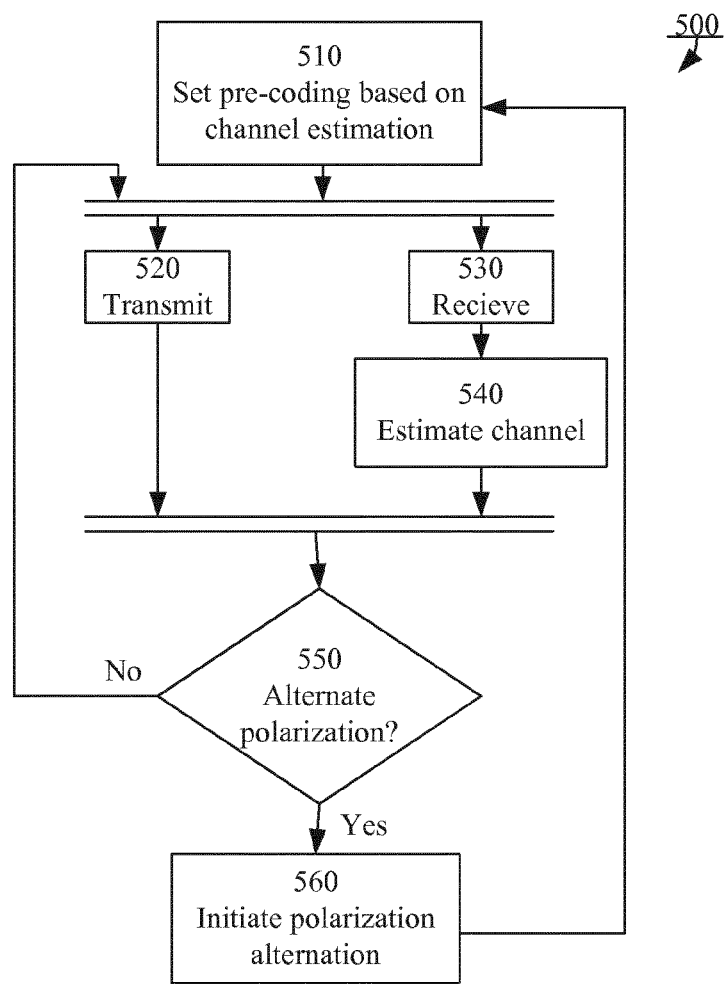
FIG. 5 is a flowchart illustrating example method steps according to some embodiments.

FIG. 5 illustrates example methods according to some embodiments. A method 500 may, for example, be performed by any of the transceivers described in connection to FIGS. 1-4.

The method 500 comprises using a communication channel to simultaneously transmit (step 520) a first signal to an other transceiver and receive (step 530) a second signal from the other transceiver, wherein the first and second signals have equal carrier frequencies and different polarizations. The first and second signals are processed (using any suitable approach) before transmission and after reception, respectively, and the second signal is used to determine (e.g. estimate, step 540) a channel characterization of the communication channel.

The method further comprises alternating between different modes of operation of the transceiver as described above. Alteration occurrences may be periodic and/or condition based as described above. As long as the polarization (i.e. the mode of operation) is not to be alternated (No-path out from step 550), transmission and reception continues without changing transmission parameters (e.g. pre-coding coefficients). When the polarization (i.e. the mode of operation) is to be alternated (Yes-path out from step 550), however, a polarization alternation is initiated (step 560), the transmission parameters (e.g. pre-coding coefficients) are set based on the freshly determined channel characterization (step 510), and transmission and reception continues when the polarization alternation is completed.

Figure 6:
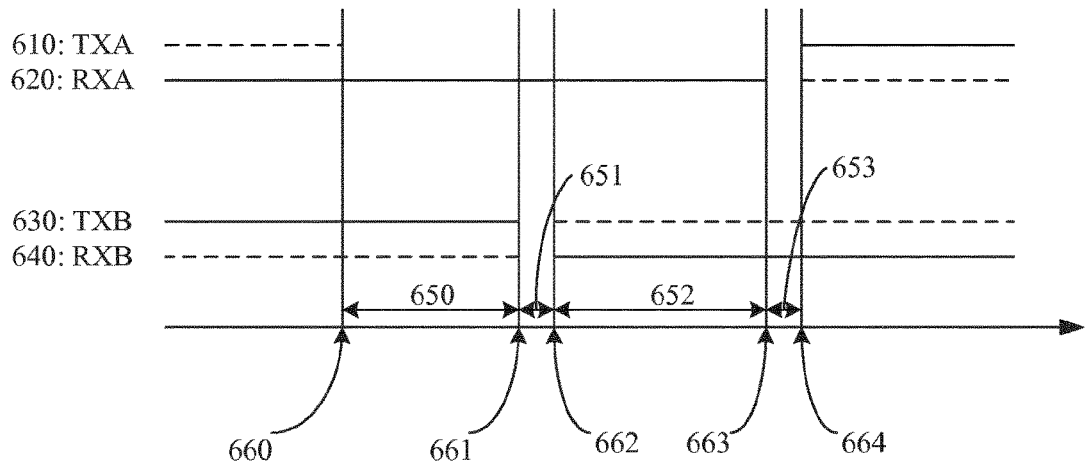
FIGS. 6-7 are schematic timing diagrams illustrating example operation according to some embodiments.
Figure 7:
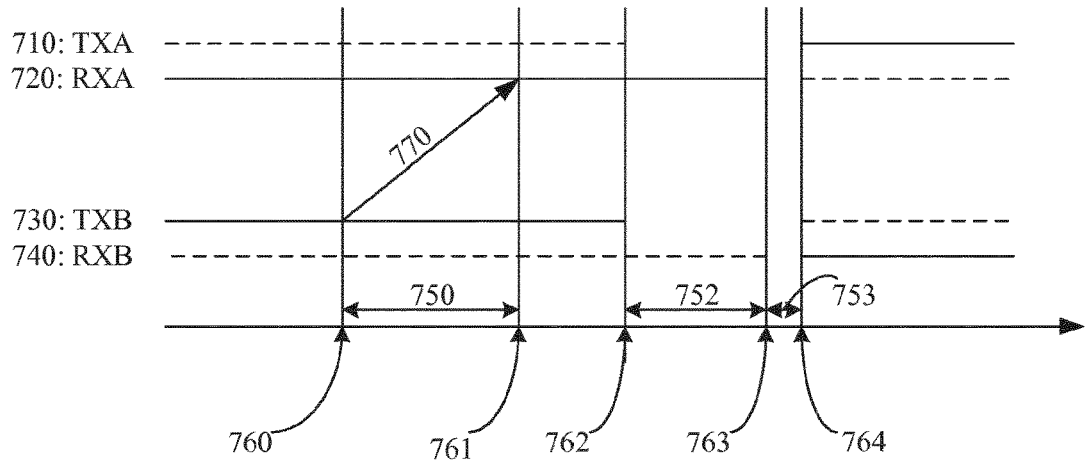

FIGS. 6 and 7 are schematic timing diagrams illustrating example mode alternation implementations of a first and second transceiver communicating with each other. The example implementation of FIG. 6 may be used whether or not there is time synchronization between the two transceivers, while the example implementation of FIG. 7 typically requires time synchronization between the two transceivers.

In FIGS. 6 and 7, time is illustrated on the horizontal axis, the first polarization is illustrated by dashed horizontal lines and the second polarization is illustrated by solid horizontal lines.

In FIG. 6, one transceiver, say transceiver A, initially transmits (TXA) 610 using the first polarization and receives (RXA) 620 using the second polarization while the other transceiver, say transceiver B, initially transmits (TXB) 630 using the second polarization and receives (RXB) 640 using the first polarization.

Transceiver A wants to initiate a mode alternation (e.g. due to a detected performance deterioration, because a timer indicates that a maximum time interval has elapsed since a previous mode alternation, or any other reason as exemplified herein). Thus, at time 660, the transceiver A initiates a mode alternation by stopping the transmission (610).

After some time 650 has passed (typically the transfer delay time between transceiver A and transceiver B), at time 661, the transceiver B detects interruption in the received signal (640) due to the stopping of transmission at transceiver A and interprets the interruption as initiation of a mode alternation. Therefore, transceiver B alternates its mode of operation by switching polarization between transmission and reception (630, 640). The mode alternation includes a minor switching time 651. At time 662, the transceiver B has alternated its mode of operation and continues transmission and reception (although there is currently no signal to receive) according to the new mode.

After some time 652 has passed (typically the transfer delay time between transceiver B and transceiver A), at time 663, the transceiver A detects interruption in the received signal (620) due to the minor switching time at transceiver B and interprets the interruption as the transceiver B having performed the mode alternation. Therefore, transceiver A alternates its mode of operation by switching polarization between transmission and reception (610, 620). The mode alternation typically includes a minor switching time 653 (which is preferably not longer than the switching time 651). At time 664, the transceiver A has also alternated its mode of operation and may resume transmission 610.

In FIG. 7, one transceiver, say transceiver A, initially transmits (TXA) 710 using the first polarization and receives (RXA) 720 using the second polarization while the other transceiver, say transceiver B, initially transmits (TXB) 730 using the second polarization and receives (RXB) 740 using the first polarization.

Transceiver B wants to initiate a mode alternation (e.g. due to a detected performance deterioration, because a timer indicates that a maximum time interval has elapsed since a previous mode alternation, or any other reason as exemplified herein). Thus, at time 760, the transceiver B initiates a mode alternation by transmitting a mode alternation notification 770 indicative of a mode alternation initiation time 762 to the transceiver A.

After some time 750 has passed (typically the transfer delay time between transceiver B and transceiver A), at time 761, the transceiver A receives the mode alternation notification 770 and interprets it as an initiation of a mode alternation.

At the mode alternation initiation time 762, both transceivers stop their transmissions (710, 730).

After some time 752 has passed (typically the transfer delay time between transceiver B and transceiver A, and vice versa), at time 763, both transceivers A and B detect interruptions in the received signal (720, 40) due to the stopping of transmission at the other transceiver and interprets the interruption as an indication that it is safe to perform the mode alternation by switching polarization between transmission and reception (710, 720 and 730, 740). The mode alternation typically includes a minor switching time 753. At time 764, both transceivers have alternated their mode of operation and resume transmission and continue reception (although there are initially no signals to receive) according to the new mode.

In the example of FIG. 6, the guard interval may be defined as the time between times 660 and 664 for transceiver A (approximately twice the transfer delay time) and as the time between times 661 and 662 for transceiver B (approximately 0).

In the example of FIG. 7, the guard interval may be defined as the time between times 762 and 764 for both transceivers (approximately the transfer delay time).

As mentioned above, transmit buffering requirements may be lowered when some embodiments are applied. Typically, the buffering requirements are set by the (maximum) length of the guard interval as opposed to the switching frequency in a traditional TDD approach. In the example of FIG. 6, buffering needs to accommodate the transmission data during the time 660-664. In the example of FIG. 7, buffering needs to accommodate the transmission data during the time 762-764.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC) and other types of hardware. All such forms are contemplated to be within the scope of this disclosure.

Embodiments may appear within an electronic apparatus (such as a wireless communication device or a network node) comprising circuitry/logic or performing methods according to any of the embodiments.

Figure 8:
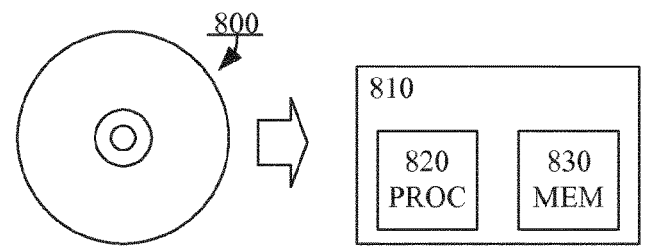
FIG. 8 is a schematic drawing illustrating an example computer readable medium according to some embodiments.

According to some embodiments, a computer program product comprises a computer readable medium. The computer-readable medium may for example be a non-transitory computer-readable medium such as, for example, a flash memory, or a read-only memory (ROM) (such as the CD-ROM 800 illustrated in FIG. 8). The computer readable medium may have stored thereon a computer program comprising program instructions. The computer program may be loadable into a data-processing unit (PROC) 820, which may, for example, be comprised in a network node 810. When loaded into the data-processing unit, the computer program may be stored in a memory (MEM) 830 associated with or integral to the data-processing unit. According to some embodiments, the computer program may, when loaded into and run by the data-processing unit, cause the data-processing unit to execute method steps according to, for example, the method shown in FIG. 5.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being perfoiined in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A transceiver for a communication node configured to transmit a first signal to an other communication node and to receive a second signal from the other communication node, the transceiver comprising:
   at least one antenna configured to simultaneously transmit the first signal and receive the second signal, wherein the first and second signals have equal carrier frequencies and different polarizations, wherein the second signal is for determining a channel characterization of a communication channel over which the second signal is received, and wherein the channel characterization is for determination of transmission parameters for the first signal;
   at least one transmitter circuit configured to process the first signal before transmission by the at least one antenna;
   at least one receiver circuit configured to process the second signal after reception by the at least one antenna; and
   a processing circuit configured to alternate a mode of operation of the transceiver between at least a first and a second mode of operation, wherein:
   the first mode of operation comprises the transceiver transmitting the first signal using a first polarization and receiving the second signal using a second polarization; and
   the second mode of operation comprises the transceiver transmitting the first signal using a third polarization and receiving the second signal using a fourth polarization; and
   wherein the at least one receiver circuit is configured to detect interruption in the received second signal and interpret the interruption as initiation of alternation of the mode of operation; and
   the processing circuit is configured to alternate the mode of operation responsive to detection of the interruption.

2. The transceiver of claim 1 wherein the one or more transmission parameters comprise pre-coding coefficients and wherein the processing circuit is further configured to:
   provide the channel characterization based on the processed second signal; and
   apply the pre-coding coefficients to the first signal before processing by the at least one transmitter circuit.

3. The transceiver of claim 1 wherein the third polarization equals the second polarization and the fourth polarization equals the first polarization.

4. The transceiver of claim 3 wherein:
   the at least one transmitter circuit comprises a first transmitter circuit configured to process the first signal according to the first polarization and a second transmitter circuit configured to process the first signal according to the second polarization;
   the at least one receiver circuit comprises a first receiver circuit configured to process the second signal according to the first polarization and a second receiver circuit configured to process the second signal according to the second polarization; and
   the processing circuit is configured to control a signal distribution network so as to:
   during a first duration of time, apply the first mode of operation by operatively connecting the at least one antenna to the first transmitter circuit and to the second receiver circuit, and by causing determination of the channel characterization based on an output of the second receiver circuit; and
   during a second duration of time, apply the second mode of operation by operatively connecting the at least one antenna to the second transmitter circuit and to the first receiver circuit, and by causing application of one or more transmission parameters to the first signal wherein the one or more transmission parameters are determined based on the channel characterization determined during the first duration of time.

5. The transceiver of claim 4 wherein the processing circuit is configured to connect the at least one antenna to the first and second transmitter circuits and to the first and second receiver circuits via a polarization duplexer.

6. The transceiver of claim 3 wherein:
   the at least one antenna comprises a first antenna system configured to transmit and receive signals according to the first polarization and a second antenna system configured to transmit and receive signals according to the second polarization; and the processing circuit is configured to control a signal distribution network so as to:
during a first duration of time, apply the first mode of operation by operatively connecting the first antenna system to the at least one transmitter circuit and operatively connecting the second antenna system to the at least one receiver circuit, and by causing determination of the channel characterization based on an output of the at least one receiver circuit; and
during a second duration of time, apply the second mode of operation by operatively connecting the first antenna system to the at least one receiver circuit and operatively connecting the second antenna system to the at least one transmitter circuit, and by causing application of one or more transmission parameters to the first signal wherein the one or more transmission parameters are determined based on the channel characterization determined during the first duration of time.

7. The transceiver of claim 1 wherein the processing circuit is configured to alternate the mode of operation periodically.

8. The transceiver of claim 1 wherein the processing circuit is configured to alternate the mode of operation based on a coherence time of the communication channel.

9. The transceiver of claim 1 wherein the processing circuit is configured to alternate the mode of operation when a deterioration of a performance metric is detected.

10. The transceiver of claim 9 wherein the processing circuit is further configured to alternate the mode of operation when a maximum time interval has elapsed since a previous alternation.

11. The transceiver of claim 1 wherein:
the at least one transmitter circuit is configured to stop the transmission of the first signal to initiate alternation of the mode of operation;
the at least one receiver circuit is configured to detect interruption in the received second signal after the transmission of the first signal has been stopped;
the processing circuit is configured to alternate the mode of operation responsive to detection of the interruption; and
the at least one transmitter circuit is configured to resume the transmission of the first signal after the mode of operation has been alternated.

12. The transceiver of claim 1 wherein the communication node and the other communication node are synchronized in time and wherein a mode alternation notification communicated between the communication node and the other communication node is configured to initiate alteration of the mode of operation and indicates a mode alternation initiation condition.

13. The transceiver of claim 12 wherein:
the at least one receiver circuit is configured to receive the mode alternation notification from the other node;
the at least one transmitter circuit is configured to stop the transmission of the first signal when the mode alternation initiation condition is fulfilled;
the at least one receiver circuit is configured to detect interruption in the received second signal after the mode alternation initiation condition is fulfilled;
the processing circuit is configured to alternate the mode of operation responsive to detection of the interruption; and
the at least one transmitter circuit is configured to resume the transmission of the first signal after the mode of operation has been alternated.

14. The transceiver of claim 12 wherein:
the at least one transmitter circuit is configured to transmit the mode alternation notification to the other node;
the at least one transmitter circuit is configured to stop the transmission of the first signal when the mode alternation initiation condition is fulfilled;
the at least one receiver circuit is configured to detect interruption in the received second signal after the mode alternation initiation condition is fulfilled;
the processing circuit is configured to alternate the mode of operation responsive to detection of the interruption; and
the at least one transmitter circuit is configured to resume the transmission of the first signal after the mode of operation has been alternated.

15. The transceiver of claim 1 wherein the at least one transmitter circuit is configured to interrupt the transmission of the first signal during a guard interval in association with the processing circuit alternating the mode of operation.

16. A communication node comprising the transceiver of claim 1.

17. A communication system comprising two transceivers according to claim 1.

18. A method of a transceiver for a communication node configured to transmit a first signal to an other communication node and to receive a second signal from the other communication node, the method comprising:
simultaneously transmitting the first signal and receiving the second signal via at least one antenna, wherein the first and second signals have equal carrier frequencies and different polarizations, wherein the second signal is for determining a channel characterization of a communication channel over which the second signal is received, and wherein the channel characterization is for determination of one or more transmission parameters for the first signal;
processing the first signal by at least one transmitter circuit before transmission by the at least one antenna;
processing the second signal by at least one receiver circuit after reception by the at least one antenna; and
alternating a mode of operation of the transceiver between at least a first and a second mode of operation, wherein:
the first mode of operation comprises the transceiver transmitting the first signal using a first polarization and receiving the second signal using a second polarization; and
the second mode of operation comprises the transceiver transmitting the first signal using a third polarization and receiving the second signal using a fourth polarization
wherein alternating the mode of operation comprises:
detecting interruption in the received second signal and interpreting the interruption as initiation of alternation of the mode of operation; and
alternating the mode of operation responsive to detection of the interruption.

* * * * *